United States Patent [19]
Carroll

[11] Patent Number: 5,209,052
[45] Date of Patent: May 11, 1993

[54] CUTTING AND MULCHING BLADE ASSEMBLY

[76] Inventor: William R. Carroll, 200 E. Holly St., Hazleton, Pa. 18201

[21] Appl. No.: 728,696

[22] Filed: Jul. 11, 1991

[51] Int. Cl.⁵ .................... A01D 34/68; A01D 34/73
[52] U.S. Cl. ...................................... 56/255; 56/17.5; 56/295; 56/DIG. 17; 56/DIG. 20
[58] Field of Search ............... 56/295, 255, 17.5, 13.4

[56] References Cited

U.S. PATENT DOCUMENTS

| | | | |
|---|---|---|---|
| 2,642,711 | 6/1953 | Smith et al. | 56/255 |
| 2,687,607 | 8/1954 | Sewell | 56/255 X |
| 2,737,003 | 3/1956 | Beers | 56/13.4 X |
| 2,857,729 | 10/1958 | Zolsdok | 56/295 |
| 3,003,298 | 10/1961 | Wininger | 56/13.8 |
| 3,080,697 | 3/1963 | Mauro | 56/295 |
| 3,382,653 | 5/1968 | De Buigne | 56/17.5 X |
| 3,445,992 | 5/1969 | Hanson et al. | 56/295 |
| 3,662,530 | 8/1972 | Henriksen | 56/295 |
| 3,910,017 | 10/1975 | Thorud et al. | 56/295 |
| 4,161,096 | 7/1979 | Biberger | 56/295 X |
| 4,189,903 | 2/1980 | Jackson et al. | 56/295 X |
| 4,292,791 | 10/1981 | Lalonde | 56/295 X |
| 4,617,788 | 10/1986 | Sebastian | 56/295 |
| 4,628,672 | 12/1986 | Jones | 56/295 |
| 4,686,819 | 8/1987 | Bryant | 56/295 |
| 4,936,884 | 6/1990 | Campbell | 56/12.7 |
| 5,094,065 | 3/1992 | Azbell | 56/295 X |

FOREIGN PATENT DOCUMENTS 131332  6/1978  Fed. Rep. of Germany ....... 56/17.5

OTHER PUBLICATIONS

Rotary Corporation, Blenville, Ga. 30427, p. 147.

Primary Examiner—Stephen J. Novosad
Attorney, Agent, or Firm—Eckert Seamans Cherin & Mellott

[57] ABSTRACT

A cutting and mulching blade assembly for a rotary type lawn mower or similar device that can be installed as an original part or as an after market application by an owner or other operator. Consisting of a two bladed design, it will cut grass, leaves and other similar materials (medium) then re-cut it several times to reduce these medium to a size much less than a conventional mower (considered mulch). It can be used as strictly a mulcher dispensing cuttings below the deck onto the ground or may be used to disperse the cuttings out of a chute onto the ground away from the device or into a bag. This can all be done without changing the blade in any way.

4 Claims, 4 Drawing Sheets

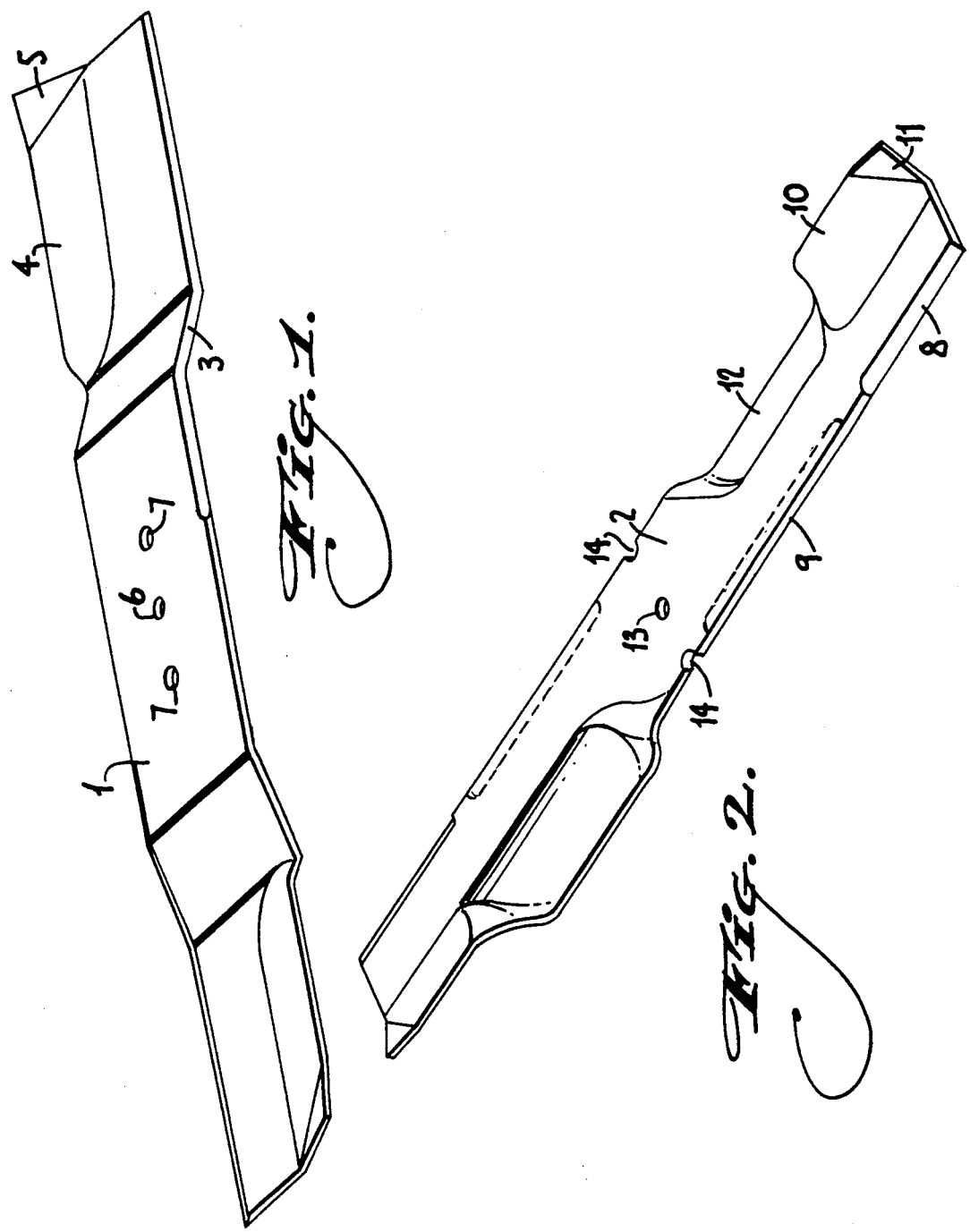

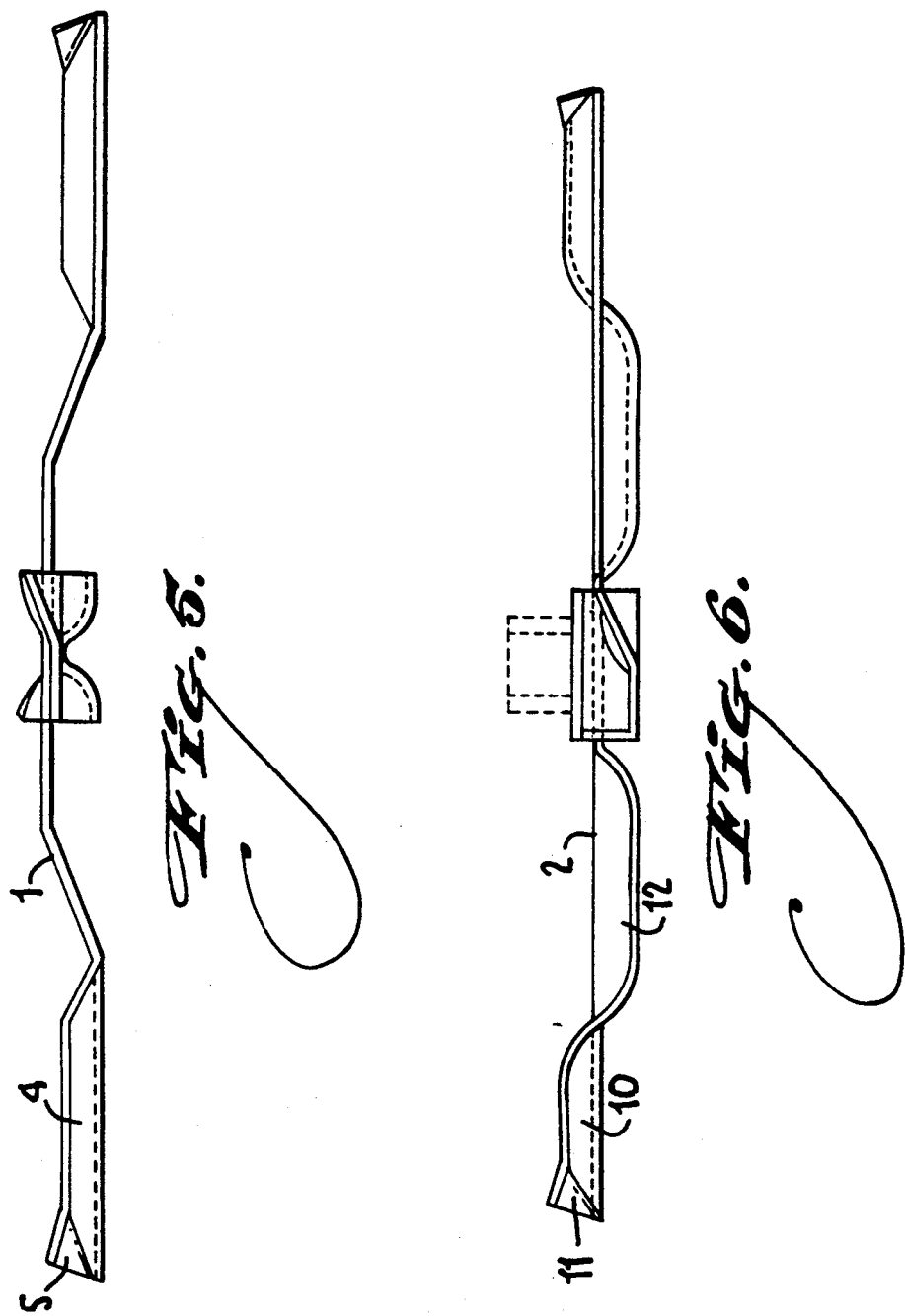

CUTTING AND MULCHING BLADE ASSEMBLY

BACKGROUND AND SUMMARY OF THE INVENTION

This invention relates to rotary lawn mowers, and more particularly to a cutting a mulching blade assembly adapted for a rotary lawn mower.

It is a general object of this invention to provide a lawn mower blade assembly that will cut, mulch and disperse grass, leaves and similar material in a variety of ways chosen by the operator, such as with a closed chute, open chute or with a bagger.

It is another object of this invention to provide a lawn mower blade assembly that will operate satisfactorily in high or damp grass and will cut more effectively, cleaner and in more applications than a regular blade.

It is still another object of this invention to provide a lawn mower blade assembly that may be applied to a wide range of existing and future production lawn mowers both as original equipment and after market application.

These and other objects of this invention are realized by a multi-level two bladed cutting and mulching blade assembly installed either as original equipment and after market applications.

BRIEF DESCRIPTION OF THE DRAWINGS

FIG. 1 is an isometric view of the bottom cutting blade of the blade assembly of this invention.

FIG. 2 is an isometric view of the top mulching blade of the blade assembly of this invention.

FIGS. 5 and 6 are side views depicting the relationship of the blades to each other and shows the outline of the adaptor used to attach the blade assembly to the motor shaft.

DESCRIPTION OF THE PREFERRED EMBODIMENT

This invention involves a cutting/mulching blade assembly comprised of a two bladed device constructed from essentially the same blanks as conventional lawn mower blades attached to the driven rotating shaft of the powerplants with an adapter and bolt with washer.

The blade assembly, after being installed will be used like any conventional blade. The only difference in usage is the options of how the cut and mulched cuttings are dispersed. The cuttings may be expelled out a conventional chute, captured in a conventional bag, or dropped onto the ground beneath the mower deck at the operator's choosing.

Figure 3:
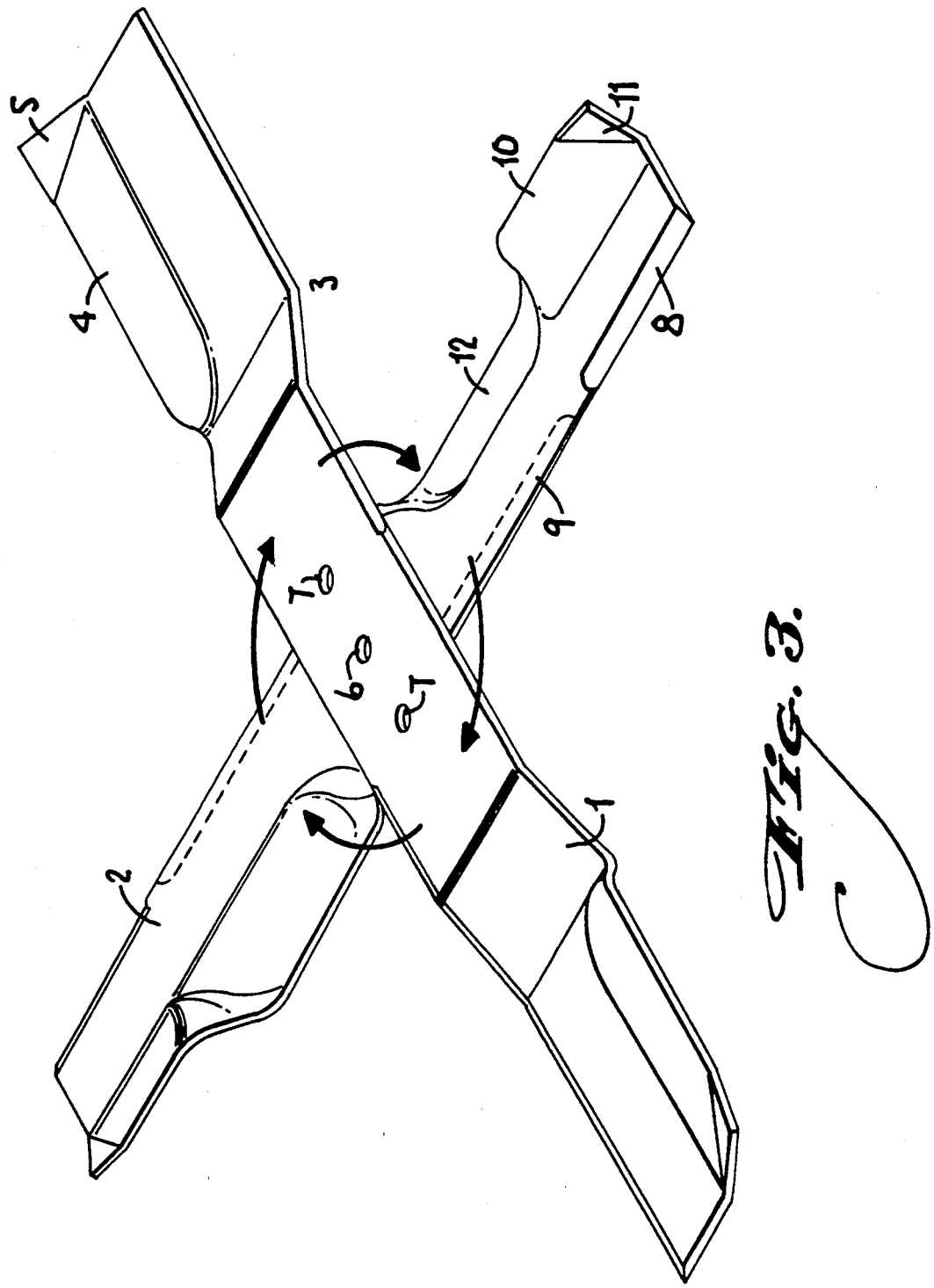
FIG. 3 is an isometric view of the two blades of the blade assembly of this invention to illustrate their position relative to each other when viewed from underneath the lawn mower.
Figure 4:
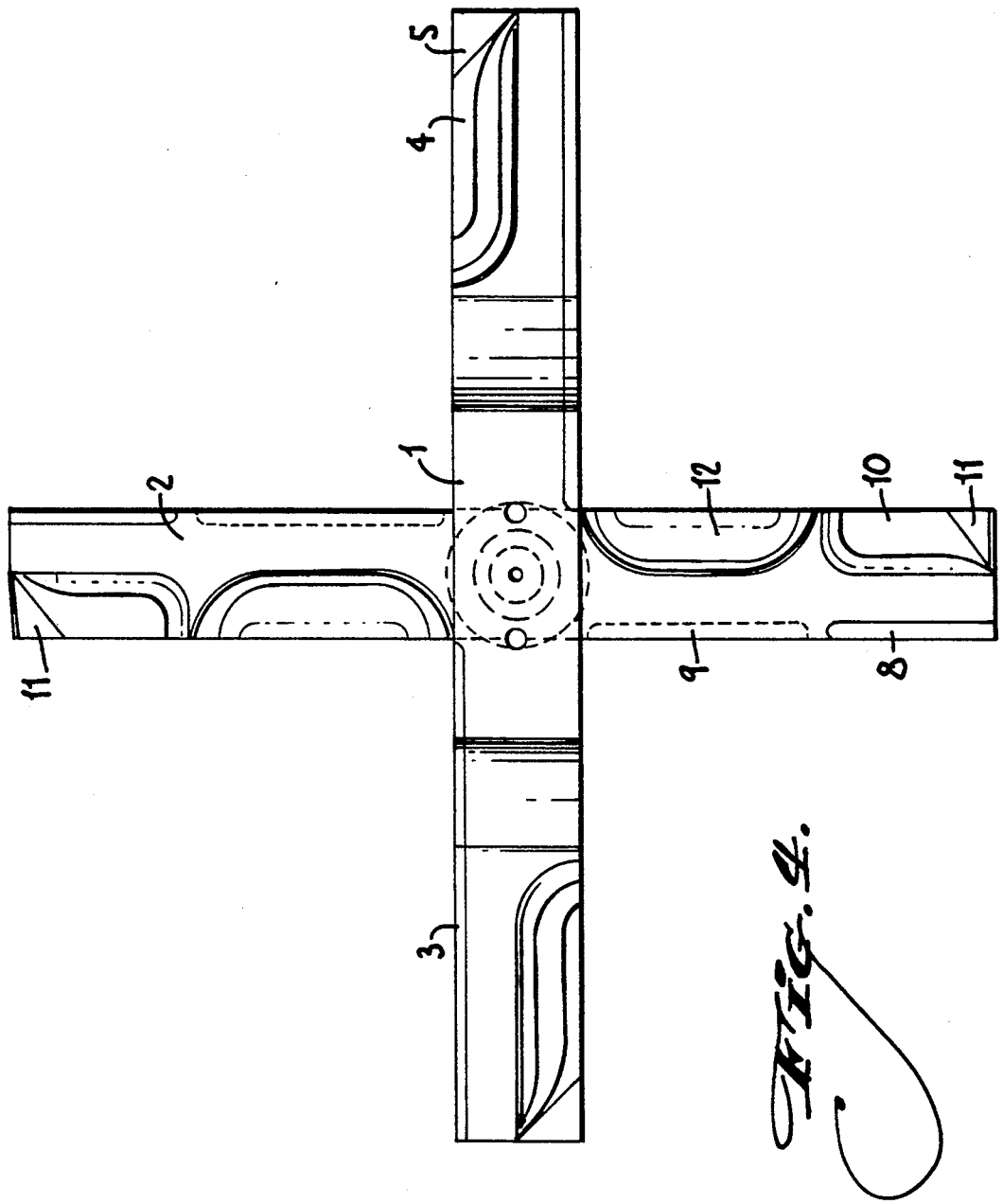
FIG. 4 is a bottom view illustrating the various components of the blade assembly of this invention and an outline of the adaptor used to attach the blade assembly to the motor shaft.

As shown in FIG. 1, the first blade 1 is manufactured from a standard length formed blade blank. It has a sharpened leading edge 3 that extends from each end of the blade inward and up the formed section, ending approximately at the edge of blade 2 when assembled. As shown in FIG. 3, the airlifts 4 of blade 1 are slightly more angled than that of a conventional blade, but resemble it in most other characteristics. At the outboard trailing edge corners of the blade 1 is a deflector 5 bent to improve and control the effect of the blade. Located in the center of the blade 1 is one hole 6 drilled to accept the bolt that holds the blade 1 to the powerplants shaft. On either side of the center hole are two holes 7. They will accept pins in the adapter that holds and locates the blade. Both ends of the blade 1 are identical which results in tow similar cutting and dynamic parts when rotating.

As shown in FIG. 2, blade 2 is formed from a straight blade blank allowing its cutting and dynamic devices to be operated in a different height plane than blade 1. Blade 2 is shorter in length than blade 1. It has an outboard cutting edge 8 similar to conventional blades, and second inboard cutting edge 9 that may either be inverted as illustrated in FIG. 2 or upright if manufacturing requires in mass production.

Blade 2 has an outboard airlift 10 that is similar to conventional blades but is slightly more angled. On the outboard trailing edge, a deflector 11 bends to control the effect of the blade 2. Inboard of the outboard airlift is an inboard airlift 12 that is inverted. In the center of the blade is a hole 13 that accepts the bolt to attach the blades to the motor. On either side, at the edges of the blade 2, are cutouts 14 to accept the pins from the adaptor to locate and position the blade 2 perpendicular to blade I. Both ends of blade 2 are identical which results in two similar cutting and dynamic parts when rotating.

The two blades 1 and 2 are assembled perpendicular to each other by a bolt with a lock washer to a commercially available adaptor to the drive shaft of the powerplants or spindle. A suitable commercially available adaptor is MTD Adaptor Part No. 17-2921 available from Rotary Corporation, Glenville, Ga. 30427. When this assembly rotates, the lower part of the blade 1 cutting edge 3 cuts the "medium" (grass, weeds, leaves or other similar material) at the desired height. The "medium" is then cut again by the outboard cutting edge 8 of the second blade 2 and is lifted by airlift 10 and deflected inward by deflector 11. Once again the medium is cut by the cutting edge 3 on blade 1, but this time by the inner upper part of cutting edge 2. The medium is cut again by inboard cutting edge 9 on blade 2 and is dispersed downward by inverted airlift 12 on blade 2. In a closed deck mower (best mode) where no exit is given (chute or bag) for the medium after the medium leaves airlift 12 it will be blown down to the ground where it will remain.

In a mowing device where there is a chute or bag, the medium cuttings will circulate around the deck, being cut several time and then dispersed out the given path. This double effect is possible due to the nature of construction and the usage of a high pressure turbulent area above the blades and a low pressure area below the blades.

I claim:

1. A cutting and mulching blade assembly for use with a rotary lawn mower having a motor and a depending drive shaft comprising:
   (A) a first cutter blade member having a sharpened cutting edge on each leading edge thereof and an airlift on each trailing edge thereof, each said sharpened cutting edge extending upwardly and inwardly from the ends of said first cutting blade member to substantially the center of rotation of said first cutting blade member;
   (b) a second mulching blade member attached perpendicular to said first cutting blade member and having a sharpened outboard cutting edge and a sharpened inboard cutting edge on each leading edge thereof, and an outboard airlift and an inboard airlift on each trailing edge thereof, said inboard airlift being inverted with respect to said outboard airlift.

2. The cutting and mulching blade assembly of claim 1 in which the second mulching blade member is shorter in length than said first cutting blade member.

3. The cutting and mulching blade assembly of claim 1 in which the first cutting blade member and said second mulching blade member are secured to each other and to said depending drive shaft by an adaptor member.

4. The cutting and mulching blade assembly of claim 1 in which each airlift on the first cutting blade member and each outboard airlift on the second mulching blade member is provided with a deflector portion.

* * * * *